Oct. 19, 1965    J. M. HOLT ET AL    3,212,326
TORSION TESTING DEVICE
Filed Sept. 24, 1962
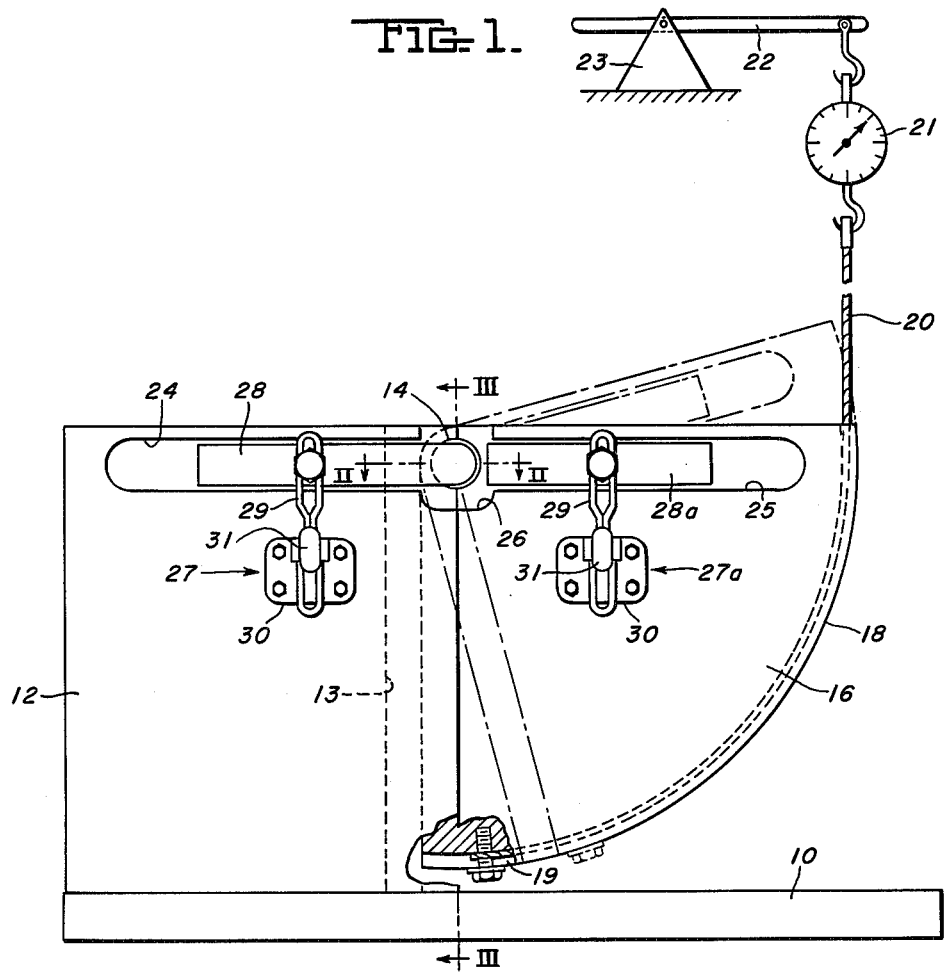
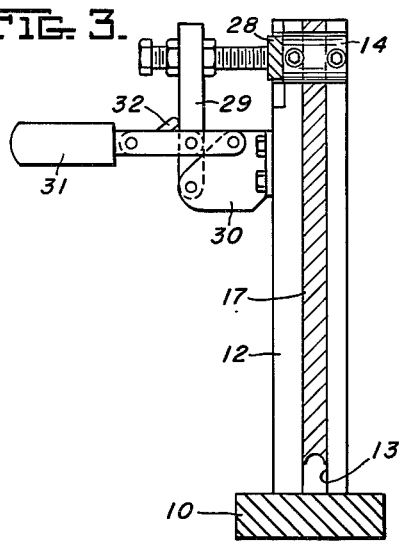
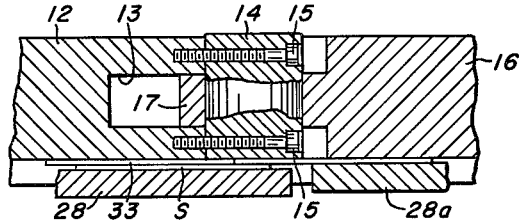
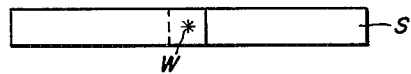
INVENTORS.
JOHN M. HOLT AND
EDWARD S. SZEKERES
By Donald G. Dalton
Attorney

United States Patent Office 3,212,326
Patented Oct. 19, 1965

3,212,326
TORSION TESTING DEVICE
John M. Holt, Forest Hills Borough, and Edward S. Szekeres, Monroeville Borough, Pa., assignors to United States Steel Corporation, a corporation of New Jersey
Filed Sept. 24, 1962, Ser. No. 225,547
3 Claims. (Cl. 73—99)

This invention relates to a torsion-testing device for spot welds.

An object of the invention is to provide a testing device which can apply a torsion load to a spot weld and measure both the torque load and angular displacement of the weld from the beginning of loading to failure of the specimen.

A further object is to provide a testing device which applies a measurable torque load to a specimen, and in which the angular displacement also is readily measured, thereby affording indications of both the strength and ductility of a spot weld in the specimen.

In accomplishing these and other objects of the invention, we have provided improved details of structure, a preferred form of which is shown in the accompanying drawing, in which:

FIGURE 1 is a side elevational view, partly diagrammatic, of our testing device;

FIGURE 2 is a horizontal section on the line II—II of FIGURE 1;

FIGURE 3 is a vertical section on line III—III of FIGURE 1; and

FIGURE 4 is a side elevational view of a test specimen.

Our testing device includes a stationary base 10 and an upright plate 12 of rectangular outline fixed to said base. The end face of plate 12 contains a vertical groove 13. A horizontal pivot pin 14 is fixed to plate 12 near the top of the groove, as with cap screws 15 (FIGURE 2). A movable plate 16, shaped as a quadrant in outline, is pivotally mounted on pin 14. Plate 16 has a tongue 17 which extends from its inner face and is received within groove 13 when the plate is in its lowered position. Plate 16 has an arcuate outer surface 18 centered about the pivotal axis of the plate and containing a groove 19. We attach a flexible cable 20 to plate 16 at the lower end of groove 19 and extend the cable upwardly within the groove and tangentially from the arcuate surface to a conventional spring scale 21. We suspend scale 21 from a lever 22 which is fulcrumed to a fixed support 23.

The sides faces of plates 12 and 16 have slots 24 and 25 respectively which extend radially of the pivotal axis of plate 16. These slots are enlarged adjacent the pivot pin 14, as indicated at 26. When we lower plate 16 about the pivot, slots 24 and 25 are aligned to receive a specimen S. As FIGURE 4 shows, the specimen consists of two sheet metal strips joined by a spot weld W. The specimen is dimensioned to fit closely in the aligned slots 24 and 25 with weld W directly over the pivot pin 14.

Plates 12 and 16 carry cooperating clamps 27 and 27a for holding the specimen within slots 24 and 25. Clamp 27 includes a bar 28 adapted to be received in slot 24 overlying the specimen and extending over the pivot pin 14. Bar 28 is mounted on a lever 29 which is pivoted to a bracket 30 fixed to the side face of plate 12 beneath slot 24. A handle 31 also is pivoted to bracket 30 and carries a keeper 32 which is engageable with lever 29 to hold the clamp bar 28 in the slot. Clamp 27a is of similar construction except that its bar 28a is shortened; hence we have not repeated the description.

In operation, we clamp a specimen S in slots 24 and 25 with the movable plate 12 lowered. We can insert a spacer bar 33 under one segment of the specimen so that bars 28 and 28a engage the specimen evenly, although this is not always necessary. We apply an upward force to cable 20 by pressing down on lever 22. This force tends to pivot plate 16 counterclockwise and thus applies a torque to the weld W. As already mentioned, the specimen is mounted with the weld lying on the pivotal axis. The force is always applied tangentially of plate 16 and with a moment arm of constant length. Scale 21 indicates the magnitude of the force applied to the cable. The torque of course equals this force multiplied by the moment arm, which equals the radius of the arcuate face 18. If desired, the scale can be graduated to indicate torques directly, for example in inch-pounds. We measure the angular displacement produced in the weld by measuring the angle between the edges of plates 12 and 16 beneath the pivot pin.

In the usual test of this type we apply a force on the cable until the weld breaks. We assess the quality of the weld both by inspecting the torsion fracture and by evaluating a graph of the torque plotted against the displacement angle. For a spot-welded specimen of low carbon steel to be assessed as "first-class," the torsion fracture should occur around the periphery of the spot weld, leaving a slug or button of material on one part of the separated specimen. The other part of the specimen has a corresponding cavity. The button should be nearly circular and have a diameter not less than 80 percent of the face diameter of the electrodes used in making the weld. A satisfactory weld of low carbon steel shows an angular displacement of at least 15° at maximum torque.

From the foregoing description, it is seen that our invention affords a simple device for effectively testing a spot weld. If desired, the device can be attached to a conventional tensile testing machine with the base 10 connected to the lower crosshead and the cable 20 to the upper crosshead.

While one embodiment of our invention has been shown and described, it will be apparent that other adaptations and modifications may be made without departing from the scope of the following claims.

We claim:

1. A device for torsion-testing a spot weld in a specimen which consists of two overlapping metal strips and a spot weld joining the strips at the overlap, said device comprising a relatively stationary plate, a second plate pivoted to said stationary plate for movement about an axis, said plates having respective slots in corresponding faces and extending radially in different directions from said axis, said second plate having a position in which said slots are aligned for receiving the respective strips of the specimen with the weld lying on said axis, cooperating means mounted on said plates for clamping the specimen in said slots, and means operatively connected to said second plate for applying a force tending to turn the second plate about said axis, thereby twisting the weld and applying a torsion load thereto.

2. A testing device as defined in claim 1 in which said second plate is shaped as a sector of a circle in outline and has an arcuate surface centered about said axis, and in which said last-named means includes a flexible cable fixed to said second plate and extending tangentially from its arcuate surface.

3. A testing device as defined in claim 2 comprising in addition a base on which said first plate is mounted in an upright position, said first plate having a vertical groove in one of its end faces, and a pivot pin fixed to said first plate adjacent the upper end of said groove and defining said axis, said second plate being pivoted to said pin and having a tongue received in said groove.

References Cited by the Examiner

UNITED STATES PATENTS

| 1,827,805 | 10/31 | Watts | 73—100 |
| 2,426,583 | 9/47 | Bailey | 73—100 |
| 2,448,133 | 8/48 | Yorgiadis | 73—100 |
| 2,637,996 | 5/53 | McKee et al. | 73—99 X |
| 2,908,162 | 10/59 | Kalbow | 73—101 X |
| 2,934,945 | 5/60 | Geenen et al. | 73—100 |
| 3,019,644 | 2/62 | Mancini | 73—96 X |

RICHARD C. QUEISSER, *Primary Examiner.*
DAVID SCHONBERG, *Examiner.*